US010491850B2

(12) United States Patent
Nagasawa (10) Patent No.: US 10,491,850 B2
(45) Date of Patent: Nov. 26, 2019

(54) APPARATUS FOR OPERATING DEVICE UPON STEERING

(71) Applicant: FUJI JUKOGYO KABUSHIKI KAISHA, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 543 days.

(21) Appl. No.: 15/271,554

(22) Filed: Sep. 21, 2016

(65) Prior Publication Data

US 2017/0094214 A1   Mar. 30, 2017

(30) Foreign Application Priority Data

Sep. 30, 2015 (JP) ................................ 2015-193812

(51) Int. Cl.
*H04N 5/00* (2011.01)
*H04N 5/44* (2011.01)
*B62D 1/04* (2006.01)
*H04N 5/50* (2006.01)
*G08C 19/00* (2006.01)
*B62D 1/06* (2006.01)
*G06F 3/0338* (2013.01)

(52) U.S. Cl.
CPC ........... *H04N 5/4403* (2013.01); *B62D 1/046* (2013.01); *B62D 1/06* (2013.01); *G06F 3/0338* (2013.01); *G08C 19/00* (2013.01); *H04N 5/50* (2013.01); *H04N 2005/4405* (2013.01)

(58) Field of Classification Search
CPC .................. H04N 5/4403; H04N 5/50; H04N 2005/4405; G06F 3/0338; B62D 1/06; B62D 1/046; G08C 19/00
See application file for complete search history.

(56) References Cited

U.S. PATENT DOCUMENTS 9,114,825 B2 * 8/2015 Nishijima ................ B62D 1/06
2003/0001816 A1   1/2003 Badarneh
(Continued)

FOREIGN PATENT DOCUMENTS

| JP | 2001-296134 | 10/2001 |
| JP | 2002-166831 | 6/2002 |

(Continued)

OTHER PUBLICATIONS

Office Action dated Jan. 10, 2017 for JP 2015-193812 (12 pages—Japanese with English translation).
(Continued)

*Primary Examiner* — Victor L MacArthur
(74) *Attorney, Agent, or Firm* — Smith, Gambrell & Russell, LLP (57) ABSTRACT

An apparatus for operating a device upon steering includes a device operating unit and a device controller. The device operating unit is ring-shaped and is disposed to surround an outer periphery of a gripping section. The device operating unit is attached in a rotatable manner about a central axis of the device operating unit and is attached in a tiltable manner such that opposite ends of the central axis rock. The device controller controls operation of an onboard device in accordance with movement of the device operating unit.

18 Claims, 7 Drawing Sheets

(56) References Cited

U.S. PATENT DOCUMENTS

| | | | | |
|---|---|---|---|---|
| 2003/0023353 | A1* | 1/2003 | Badarneh | B60K 35/00 701/1 |
| 2003/0094354 | A1* | 5/2003 | Badarneh | G06F 3/0338 200/18 |
| 2003/0131681 | A1* | 7/2003 | Gu | B62D 1/043 74/552 |
| 2004/0051392 | A1* | 3/2004 | Badarneh | G06F 3/0346 307/112 |
| 2004/0104898 | A1* | 6/2004 | Badarneh | G06F 1/1626 345/169 |
| 2005/0030166 | A1* | 2/2005 | Kraus | B60R 16/0232 340/407.1 |
| 2005/0199436 | A1* | 9/2005 | Schroder | B62D 1/046 180/402 |
| 2006/0230873 | A1* | 10/2006 | Buiocchi | B22D 15/005 74/552 |
| 2006/0230874 | A1* | 10/2006 | Buiocchi | B22D 15/005 74/552 |
| 2008/0200217 | A1* | 8/2008 | Venhofen | B60R 11/0264 455/569.2 |
| 2009/0005125 | A2* | 1/2009 | Venhofen | B60R 11/0264 455/569.2 |
| 2015/0029111 | A1* | 1/2015 | Trachte | G06F 3/0418 345/173 |
| 2015/0198448 | A1* | 7/2015 | Sanma | G08G 1/166 701/400 |
| 2017/0305453 | A1* | 10/2017 | Nishio | B62D 1/046 |

FOREIGN PATENT DOCUMENTS

| | | |
|---|---|---|
| JP | 2003-531046 A | 10/2003 |
| JP | 2004-074820 | 3/2004 |
| JP | 2007-076539 A | 3/2007 |
| JP | 2008-168839 | 7/2008 |
| JP | 2014-058293 A | 4/2014 |
| JP | 2014-205435 A | 10/2014 |
| JP | 2014-211690 | 11/2014 |
| WO | 2015-136901 | 9/2015 |

OTHER PUBLICATIONS

Office Action dated Aug. 17, 2017 for JP 2015-193812 (8 pages—Japanese with English translation).

\* cited by examiner

APPARATUS FOR OPERATING DEVICE UPON STEERING

CROSS-REFERENCE TO RELATED APPLICATIONS

The present application claims priority from Japanese Patent Application No. 2015-193812 filed on Sep. 30, 2015, the entire contents of which are hereby incorporated by reference.

BACKGROUND

1. Technical Field

The present invention relates to apparatuses for operating a device upon steering, and particularly, to an apparatus for operating a device upon steering for operating an onboard device equipped in a vehicle while gripping a steering wheel.

2. Related Art

In recent years, there are demands for safely operating onboard devices equipped in vehicles, such as navigation devices, audio devices, and air-conditioning devices, while driving vehicles. There has been proposed an apparatus for operating a device upon steering in which a device operating unit for operating an onboard device is disposed at the steering wheel.

Normally, in an apparatus for operating a device upon steering, the device operating unit is disposed in a spoke section located at the inner side of a gripping section of the steering wheel so as not to interfere with the driver who drives the vehicle by gripping the gripping section. However, depending on the position of the device operating unit, the driver may have to operate the device operating unit by releasing his/her hand from the gripping section. Thus, there is a demand for an apparatus for operating a device upon steering in which the device operating unit can be operated more safely.

For instance, Japanese Unexamined Patent Application Publication (JP-A) No. 2014-211690 proposes a touch input apparatus as a technology for safely operating the device operating unit. In this touch input apparatus, a first detector is disposed in a range with which one of the thumbs of the driver comes into contact in a state where the driver is gripping the steering wheel of the vehicle with both hands, and a second detector is disposed in a range with which the other thumb comes into contact. By touching the detectors, an input is performed with respect to an onboard device. In this touch input apparatus, the detectors are disposed in the ranges with which the thumbs come into contact so that the detectors can be touched without having to remove the hands from the steering wheel, whereby the detectors can be safely operated.

However, in order to operate the detectors in the touch input apparatus according to JP-A No. 2014-211690, the driver has to check the positions of the detectors by temporarily shifting the line of vision to the detectors since it is difficult to haptically ascertain the positions of the detectors. Moreover, when operating the detectors, the driver moves the thumbs toward the spoke section and does not grip the gripping section at appropriate positions, possibly having an effect on the handling of the steering wheel.

SUMMARY OF THE INVENTION

It is desirable to provide an apparatus for operating a device upon steering that can be safely operated while a gripping section of a steering wheel is gripped.

A first aspect of the present invention provides an apparatus for operating a device upon steering. The device is an onboard device equipped in the vehicle. The apparatus is configured to be used by a driver driving a vehicle for operating the onboard device while gripping a gripping section of a steering wheel. The apparatus includes a device operating unit and a device controller. The device operating unit is ring-shaped and is disposed to surround an outer periphery of the gripping section. The device operating unit is attached in a rotatable manner about a central axis of the device operating unit and is attached in a tiltable manner such that opposite ends of the central axis rock. The device controller controls operation of the onboard device in accordance with movement of the device operating unit.

The device operating unit may have an outer peripheral edge that is substantially circular.

The device controller may control first channels with respect to the operation of the onboard device in accordance with a rotation amount of the device operating unit and may control second channels with respect to the operation of the onboard device in accordance with the number of times the device operating unit is tilted.

The onboard device may have a display unit disposed facing the driver and may display the first channels side-by-side in a left-right direction of the display unit and the second channels side-by-side in an up-down direction of the display unit. The device controller may select one of the first channels in the left-right direction in accordance with the rotation amount of the device operating unit and may select one of the second channels in the up-down direction in accordance with the number of times the device operating unit is tilted.

The device operating unit may be attached in a slidable manner such that the central axis moves parallel to a thickness direction of the gripping section.

The device controller may set the operation of the onboard device in accordance with sliding of the device operating unit.

The apparatus may further include a locking section that locks the movement of the device operating unit.

The gripping section may have a recess that is wide at a surface side and a reverse surface side thereof such that a contact range in which a finger of the driver comes into contact with the device operating unit is increased. The recess may be provided at a position where the device operating unit is disposed in the gripping section.

A second aspect of the present invention provides an apparatus for operating a device upon steering. The device is an onboard device equipped in the vehicle. The apparatus is configured to be used by a driver driving a vehicle for operating an onboard device while gripping a gripping section of a steering wheel. The apparatus includes a device operating unit and a device controller. The device operating unit is ring-shaped and is disposed to surround an outer periphery of the gripping section. The device operating unit is attached in a rotatable manner about a central axis of the device operating unit. The device controller controls operation of the onboard device in accordance with movement of the device operating unit.

DETAILED DESCRIPTION

An example of the present invention will be described below with reference to the appended drawings.

Figure 1:
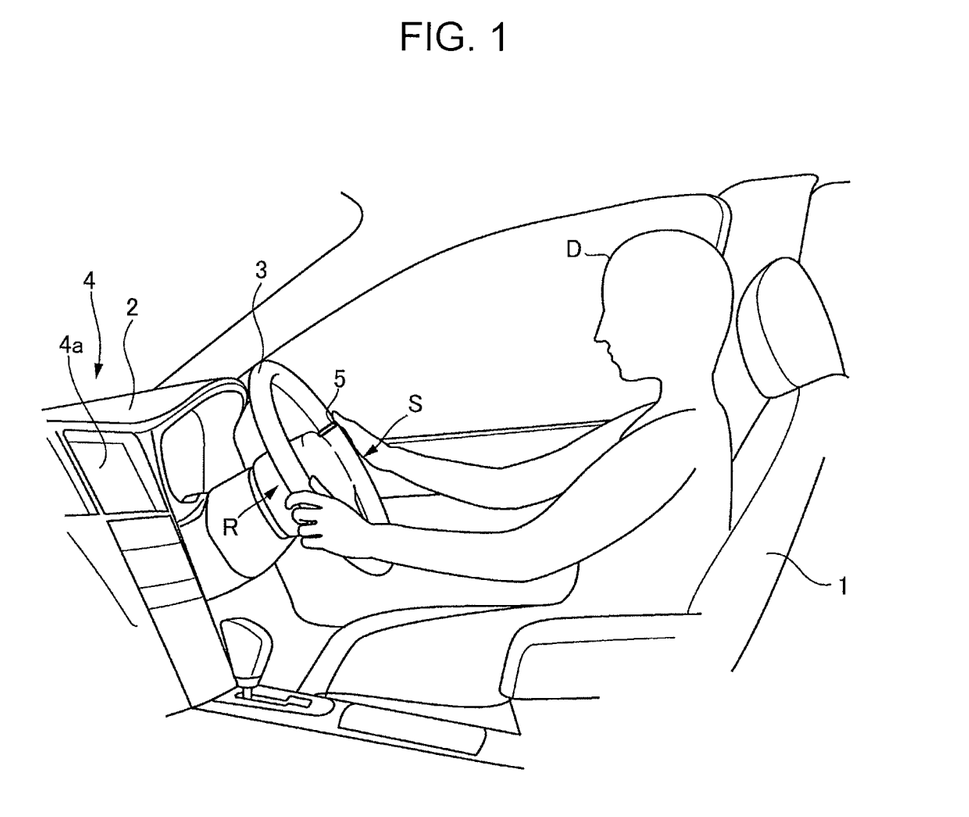
FIG. 1 illustrates the configuration of a vehicle equipped with an apparatus for operating a device upon steering according to an example of the present invention.

FIG. 1 illustrates the configuration of a vehicle equipped with an apparatus for operating a device upon steering according to an example of the present invention. This vehicle has a driver seat 1, an instrument panel 2 disposed in front of the driver seat 1, a steering wheel 3 disposed between the driver seat 1 and the instrument panel 2, a navigation device 4 disposed in the instrument panel 2, and a device operating apparatus 5 disposed at the steering wheel 3.

The instrument panel 2 extends in the vehicle width direction across the front of the vehicle cabin, and various onboard devices including the navigation device 4 are disposed in the instrument panel 2.

The navigation device 4 has a display unit 4a that displays, for instance, map information to a driver D driving the vehicle. The display unit 4a is disposed in the middle of the instrument panel 2 in the vehicle width direction so as to face the driver seat 1.

Figure 2:
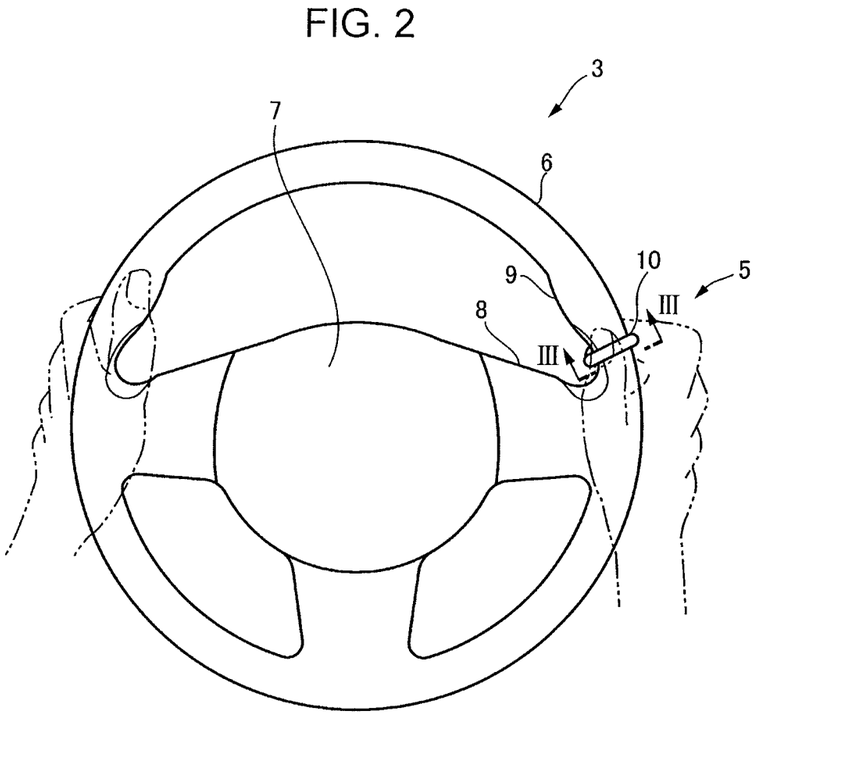
FIG. 2 illustrates the configuration of a steering wheel.

The steering wheel 3 is disposed such that a surface S thereof faces the driver seat 1 and a reverse surface R thereof faces the instrument panel 2. As illustrated in FIG. 2, the steering wheel 3 has a ring-shaped gripping section 6, a boss section 7 disposed substantially in the middle of the gripping section 6, and spoke sections 8 that couple the gripping section 6 and the boss section 7 to each other.

The gripping section 6 is to be gripped by the driver D when driving the vehicle and is disposed such that the central axis thereof extends slantwise gradually upward from the front toward the rear. The gripping section 6 has a circular cross section. Placement sections 9 that protrude inwardly from the inner peripheral surface of the gripping section 6 are provided at the opposite sides thereof. The placement sections 9 are provided for allowing the driver D to place the thumbs thereon when gripping the gripping section 6, and are disposed at the upper half of the gripping section 6, that is, at the upper side relative to the central axis of the gripping section 6.

The spoke sections 8 extend from the opposite sides and the lower side of the boss section 7.

Figure 3:
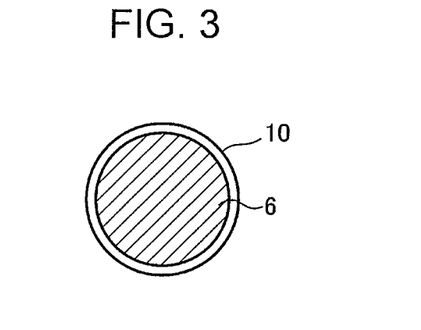
FIG. 3 is a cross-sectional view taken along line III-III in FIG. 2 and illustrates a device operating unit disposed to surround a gripping section.

The device operating apparatus 5 is to be used by the driver D for operating the navigation device 4 while gripping the gripping section 6 of the steering wheel 3 and has a device operating unit 10 disposed at the right side of the gripping section 6. The device operating unit 10 is disposed near the bottom of one of the placement sections 9 at the upper half of the gripping section 6. The device operating unit 10 is ring-shaped and surrounds the outer periphery of the gripping section 6. As illustrated in FIG. 3, the device operating unit 10 has an outer peripheral edge with a substantially circular shape, and the outer diameter thereof is larger than the gripping section 6. The device operating unit 10 is disposed to protrude from the outer peripheral surface of the gripping section 6 along the entire circumference thereof.

Figure 4A:
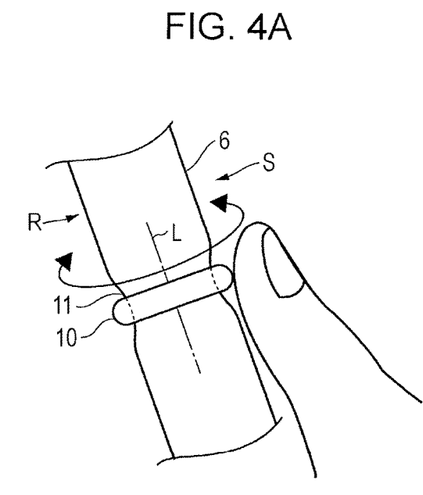
FIGS. 4A to 4C illustrate how the device operating unit is operated.

As illustrated in FIG. 4A, the device operating unit 10 is attached to the gripping section 6 in a rotatable manner about a central axis L of the device operating unit 10. Thus, the surface S side and the reverse surface R side of the device operating unit 10 rotationally move in the left-right direction relative to the vehicle. For instance, the surface S side of the device operating unit 10 is rotationally operated in the left-right direction by the driver D.

The gripping section 6 is provided with a recess 11 at the position where the device operating unit 10 is disposed so that the device operating unit 10 can be smoothly operated.

Figure 4B:
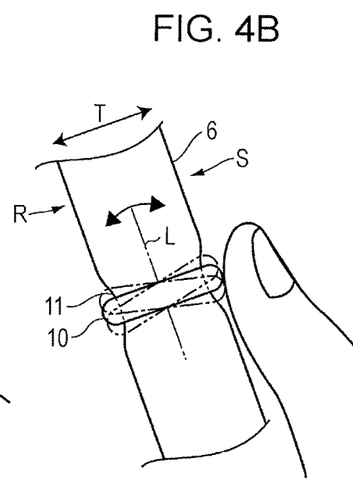

Furthermore, as illustrated in FIG. 4B, the device operating unit 10 is attached to the gripping section 6 in a tiltable manner such that the opposite ends of the central axis L of the device operating unit 10 rock between the surface S and the reverse surface R of the gripping section 6, that is, in a thickness direction T of the gripping section 6. The central axis L rocks in the thickness direction T at the center of the gripping section 6. Thus, the surface S side and the reverse surface R side of the device operating unit 10 move in the up-down direction along the gripping section 6. For instance, the surface S side of the device operating unit 10 is tilted in the up-down direction by the driver D.

Figure 4C:
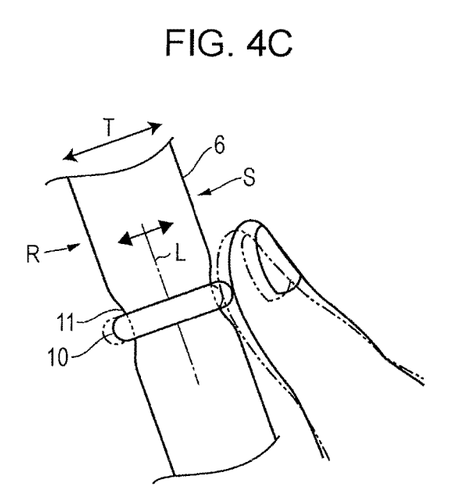

Furthermore, as illustrated in FIG. 4C, the device operating unit 10 is attached to the gripping section 6 in a slidable manner such that the central axis L moves parallel to the thickness direction T of the gripping section 6. Thus, the device operating unit 10 is slid by, for instance, pressing the surface S side thereof toward the reverse surface R side thereof.

The device operating unit 10 is biased such that the device operating unit 10 returns to its original neutral position, that is, either one of non-tilted and non-slid positions, after being tilted or slid.

Next, the configuration of the device operating apparatus 5 will be described in detail.

Figure 5:
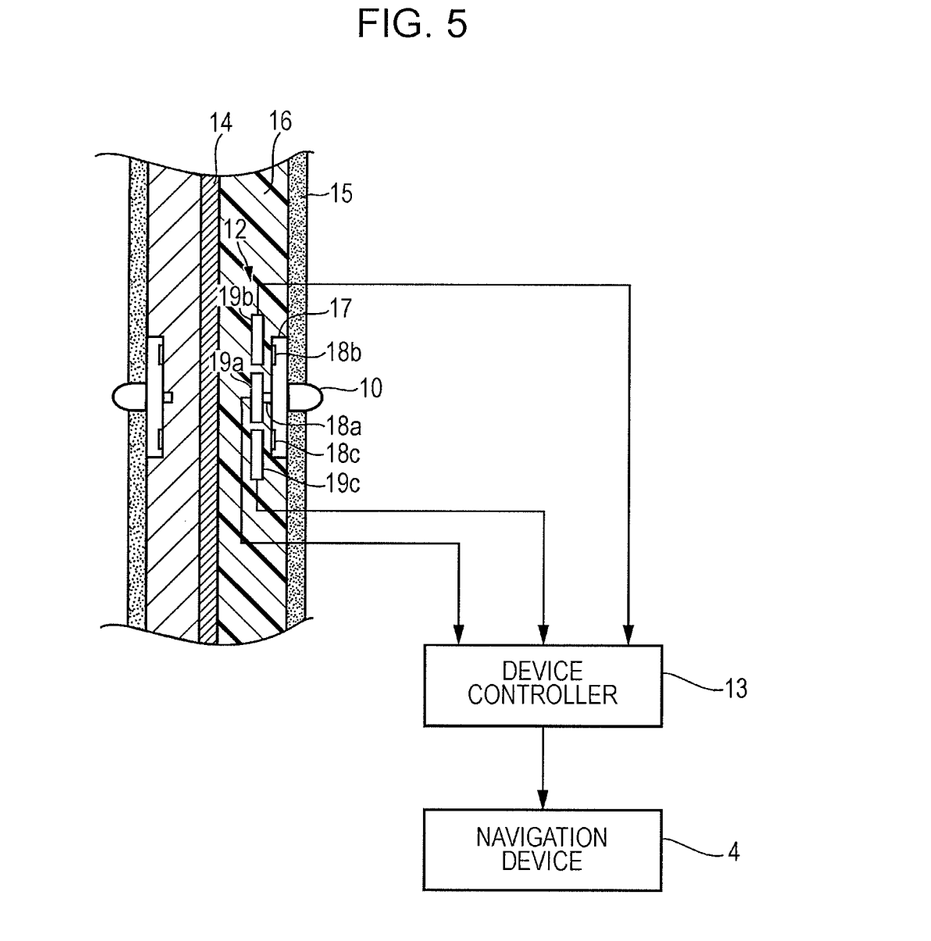
FIG. 5 is a cross-sectional view illustrating the configuration of a device operating apparatus.

As illustrated in FIG. 5, the device operating apparatus 5 has a movement detector 12 disposed inside the gripping section 6 in correspondence with the device operating unit 10, and also has a device controller 13 coupled to the movement detector 12 and the navigation device 4.

The gripping section 6 has a cored bar 14, a skin 15 that covers the outer side of the cored bar 14, and a soft portion 16 disposed between the cored bar 14 and the skin 15. The cored bar 14 supports the gripping section 6 and extends in a ring shape through the center of the gripping section 6. The soft portion 16 may be composed of a resinous material, such as polyurethane, and the skin 15 may be composed of a skin material, such as synthetic leather.

The device operating unit 10 has a support 17 disposed inside the gripping section 6. The support 17 is ring-shaped and is wide in the direction in which the gripping section 6 extends. The support 17 supports the device operating unit 10 inside the gripping section 6.

The movement detector 12 has a central contact 18a disposed at the center of the base surface of the support 17, end contacts 18b and 18c disposed to flank the central contact 18a on the base surface of the support 17, a rotation detector 19a disposed facing the central contact 18a, and tilt detectors 19b and 19c respectively disposed facing the end contacts 18b and 18c.

The central contact 18a includes a plurality of contacts that are disposed side-by-side in the circumferential direction of the support 17 and that are sequentially coupled to the rotation detector 19a in accordance with rotation of the device operating unit 10.

The end contacts 18b and 18c are coupled to the tilt detectors 19b and 19c in accordance with tilting or sliding of the device operating unit 10.

The rotation detector 19a outputs a detection signal, which is obtained by being coupled to the central contact 18a, to the device controller 13. Specifically, the rotation detector 19a detects rotation of the device operating unit 10 based on a mechanism similar to that of a rotary switch. The tilt detectors 19b and 19c output detection signals, which are obtained by being coupled to the end contacts 18b and 18c, to the device controller 13.

The device controller 13 determines the movement of the device operating unit 10 based on a detection signal output from the movement detector 12 and controls the operation of the navigation device 4 in accordance with the movement of the device operating unit 10.

In detail, the device controller 13 determines the rotation amount of the device operating unit 10, that is, the rotation distance by which the device operating unit 10 is rotated in the left-right direction with reference to a predetermined position, based on the detection signal input from the rotation detector 19a, and controls first channels with respect to the operation of the navigation device 4 in accordance with the rotation amount. Furthermore, the device controller 13 determines the number of times the device operating unit 10 is tilted, that is, the number of times the device operating unit 10 is tilted in the up-down direction with reference to the neutral position of the non-tilted device operating unit 10, based on the detection signals input from the end contacts 18b and 18c, and controls second channels with respect to the operation of the navigation device 4 in accordance with the number of times the device operating unit 10 is tilted. Moreover, the device controller 13 detects sliding movement of the device operating unit 10 based on the detection signals input from the end contacts 18b and 18c and controls the operation of the navigation device 4 in accordance with the sliding movement.

Next, the operation according to this example will be described.

First, as illustrated in FIG. 1, the driver D drives the vehicle by gripping the gripping section 6 of the steering wheel 3. If the driver D desires to operate the navigation device 4 while driving the vehicle, the driver D operates the navigation device 4 by placing a finger on the device operating unit 10, as illustrated in FIG. 2.

In this case, since the device operating unit 10 is disposed in the gripping section 6, the device operating unit 10 can be safely operated in a state where the gripping section 6 is gripped at appropriate grip positions without having to move a finger or hand by a large distance. Furthermore, since the device operating unit 10 is disposed to surround the outer periphery of the gripping section 6 and is attached thereto in a rotatable and tiltable manner, a plurality of operations can be performed smoothly in accordance with the shape of the gripping section 6.

Moreover, since the device operating unit 10 has an outer peripheral edge with a substantially circular shape, the device operating unit 10 can maintain its form even when rotated, thereby allowing for a stable rotating operation.

Furthermore, as illustrated in FIG. 3, the device operating unit 10 is disposed to protrude from the outer peripheral surface of the gripping section 6. Therefore, the driver D can simply ascertain the position of the device operating unit 10 haptically with his/her finger without having to shift the line of vision to the device operating unit 10. Moreover, the device operating unit 10 can be stably operated since the device operating unit 10 protrudes from the outer peripheral surface of the gripping section 6 along the entire circumference thereof.

Figure 6:
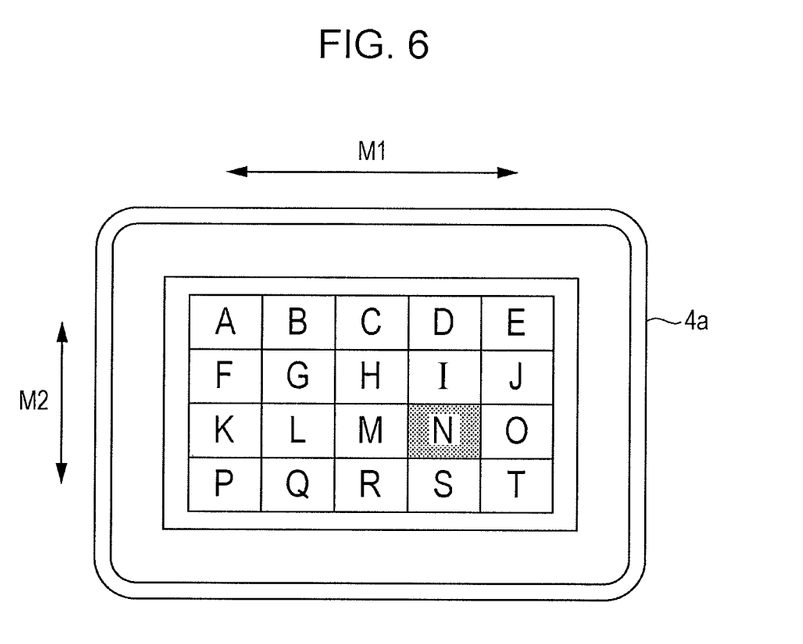
FIG. 6 illustrates a state where channels are displayed side-by-side two-dimensionally in the left-right direction and the up-down direction on a display unit.

For instance, as illustrated in FIG. 6, the navigation device 4 displays channels M1 side-by-side in the left-right direction of the display unit 4a, and also displays channels M2 side-by-side in the up-down direction of the display unit 4a.

If the driver D desires to select one of the channels M1 displayed on the display unit 4a, the driver D rotates the device operating unit 10, as illustrated in FIG. 4A. In this case, for instance, when the driver D rotates the device operating unit 10 by touching the surface S side thereof, the device operating unit 10 is rotated in the left-right direction, so that the operated direction thereof matches the array direction of the channels M1 displayed on the display unit 4a. Therefore, the rotating operation of the device operating unit 10 can be performed haptically, thereby allowing for stable driving of the vehicle without having to shift the attention to the operation of the device operating unit 10.

As illustrated in FIG. 5, the movement detector 12 sequentially detects the rotation of the device operating unit 10, and the device controller 13 selects one of the channels M1 in the left-right direction in accordance with the rotation amount of the device operating unit 10. For instance, if the device operating unit 10 is rotated so as to proceed by three items in the right direction from "A" of the channels M1, "D" is selected.

Then, if the driver D desires to select one of the channels M2 displayed on the display unit 4a, the driver D tilts the device operating unit 10, as illustrated in FIG. 4B. In this case, for instance, when the driver D tilts the device operating unit 10 by touching the surface S side thereof, the device operating unit 10 is tilted in the up-down direction, so that the operated direction thereof matches the array direction of the channels M2 displayed on the display unit 4a. Therefore, similar to the rotating operation, the tilting operation of the device operating unit 10 can be performed haptically, thereby allowing for stable driving of the vehicle without having to shift the attention to the operation of the device operating unit 10.

The tilting of the device operating unit 10 is detected by the movement detector 12, and the device controller 13 selects one of the channels M2 in the up-down direction in accordance with the number of times the device operating unit 10 is tilted. For instance, if the device controller 13 receives a detection signal from the tilt detector 19b alone, that is, if the tilt detector 19b and the end contact 18b are coupled to each other and the tilt detector 19c and the end contact 18c are uncoupled from each other, the device controller 13 determines that the device operating unit 10 is tilted upward. In contrast, if a detection signal is received from the tilt detector 19c alone, the device controller 13 determines that the device operating unit 10 is tilted downward.

For instance, if the device operating unit 10 is tilted downward only twice, the device controller 13 proceeds by two items downward from "D" so as to select "N".

When the driver D selects "N" from the channels M1 and M2 in this manner, the driver D slides the device operating unit 10, as illustrated in FIG. 4C. This sliding operation can also be performed haptically, thereby allowing for stable driving of the vehicle without having to shift the attention to the operation of the device operating unit 10.

The sliding of the device operating unit 10 is detected by the movement detector 12, and the item selected by the device controller 13 is set. If detection signals are received from both the tilt detector 19b and the tilt detector 19c, that is, if the tilt detector 19b and the end contact 18b are coupled to each other and the tilt detector 19c and the end contact 18c are coupled to each other, the device controller 13 determines that the device operating unit 10 is slid.

Consequently, the device controller 13 sets "N" as the desired item.

Accordingly, the driver D can safely operate the device operating unit 10 while driving the vehicle.

According to this example, since the device operating unit 10 is ring-shaped, is disposed to surround the outer periphery of the gripping section 6, and is attached thereto in a rotatable and tiltable manner, the driver D can safely operate the device operating unit 10 while gripping the gripping section 6.

In the above-described example, it is preferable that the device operating apparatus 5 further has a locking section that locks the movement of the device operating unit 10.

Figure 7:
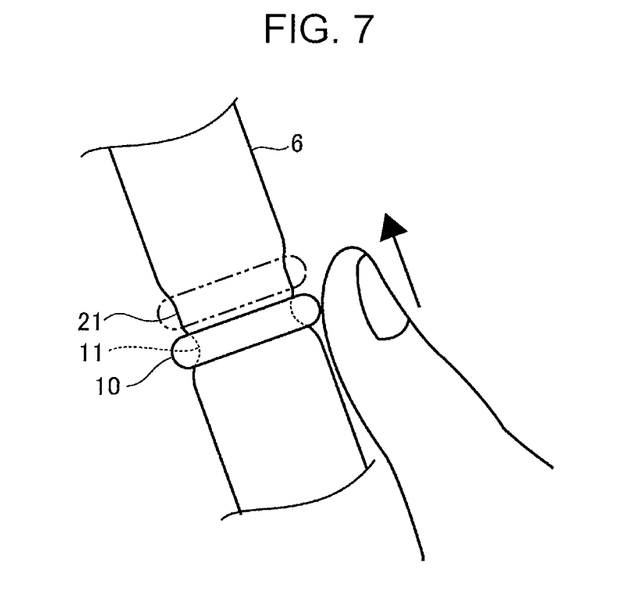
FIG. 7 illustrates the configuration of a locking section that locks the movement of the device operating unit.

For instance, as illustrated in FIG. 7, the device operating apparatus 5 may be provided with a locking section 21 in the recess 11 of the gripping section 6. This locking section 21 forms a step in the recess 11 and has an outer diameter that is substantially equal to the inner diameter of the device operating unit 10. Therefore, by moving the device operating unit 10 from the recess 11 to the locking section 21, the outer peripheral surface of the locking section 21 comes into contact with the inner peripheral surface of the device operating unit 10, so that the movement of the device operating unit 10 can be locked.

By locking the movement of the device operating unit 10 in this manner, an erroneous operation of the device operating unit 10 can be prevented, thereby allowing for stable driving of the vehicle.

Furthermore, in the above-described example, the gripping section 6 preferably has a wide recess at the position where the device operating unit 10 is disposed so that the contact range in which a finger of the driver D comes into contact with the device operating unit 10 is increased.

Figure 8:
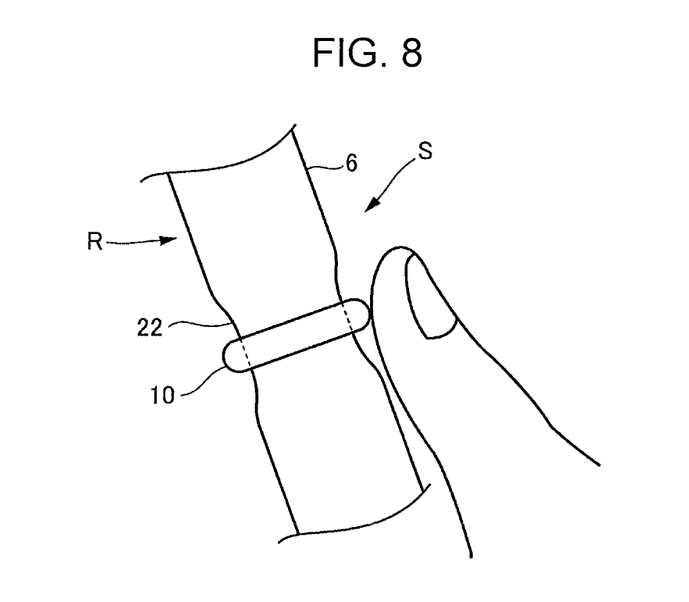
FIG. 8 illustrates a wide recess provided in the gripping section.

For instance, as illustrated in FIG. 8, a recess 22 may be disposed in place of the recess 11 of the gripping section 6. This recess 22 is wider at the surface S side and the reverse surface R side than the recess 11. Normally, the driver D tends to operate the device operating unit 10 by touching the surface S side and the reverse surface R side thereof using a thumb and an index finger. With the recess 22, the contact range of the device operating unit 10 relative to the thumb and the index finger can be increased.

By increasing the contact range of the device operating unit 10 in this manner, the driver D can operate the device operating unit 10 while gripping the gripping section 6.

Figure 9:
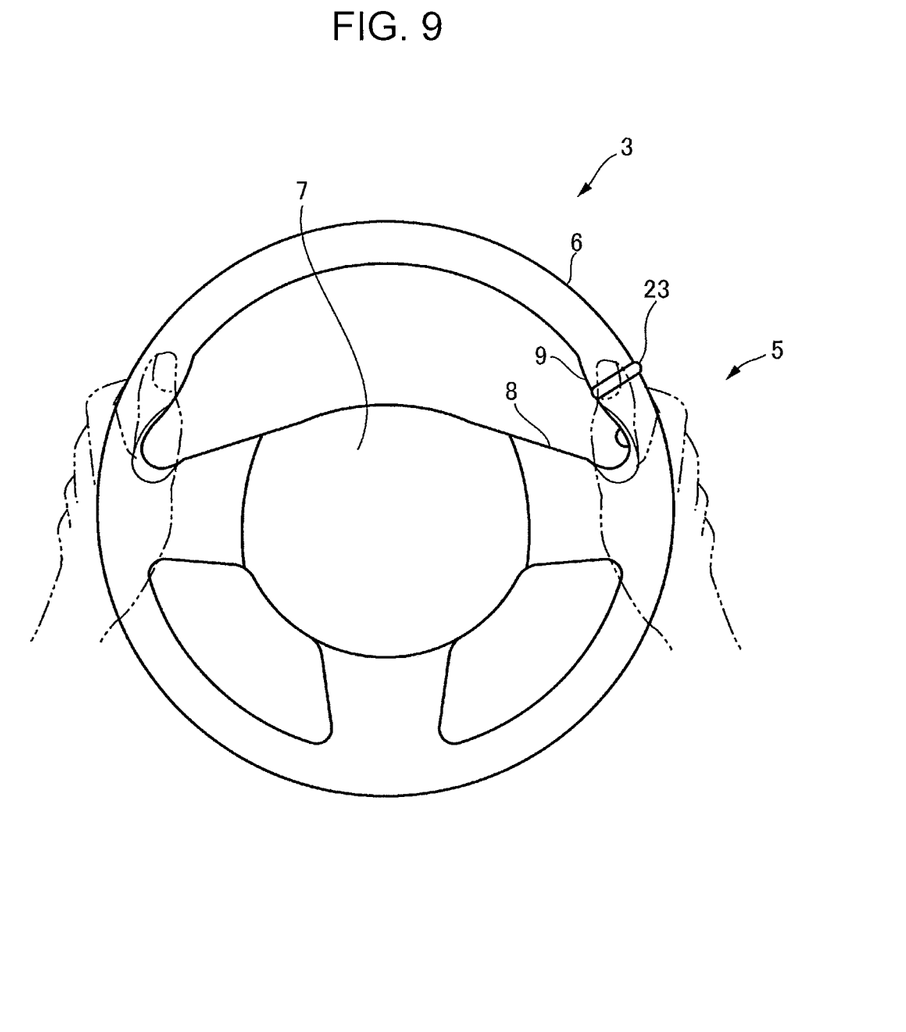
FIG. 9 illustrates a device operating unit disposed near the center of a placement section.

Furthermore, although the device operating unit 10 is disposed near the bottom of the placement section 9 of the gripping section 6 in the above-described example, the position of the device operating unit 10 is not limited thereto so long as the device operating unit 10 is disposed to surround the gripping section 6. The device operating unit 10 is preferably disposed at a position that provides high operability in accordance with, for instance, the angle of the gripping section 6 and the position of the placement section 9. For instance, as illustrated in FIG. 9, a device operating unit 23 may be disposed near the center of the placement section 9.

Furthermore, although the device operating unit 10 is tilted such that the opposite ends of the central axis L rock in the thickness direction T of the gripping section 6 in the above-described example, the direction is not limited to the thickness direction T so long as the opposite ends of the central axis L are made to rock. For instance, the device operating unit 10 may be tilted such that the central axis L rocks in the width direction of the gripping section 6, which is orthogonal to the thickness direction T.

Furthermore, although the device operating unit 10 is tilted such that the opposite ends of the central axis L rock only in the thickness direction T of the gripping section 6 in the above-described example, the device operating unit 10 may be tilted such that the opposite ends of the central axis L rock in another direction in addition to the thickness direction T. For instance, the device operating unit 10 may be tilted such that the opposite ends of the central axis L rock in the thickness direction T and the width direction of the gripping section 6. Accordingly, the device operating unit 10 can be tilted in a plurality of directions, thereby allowing for control of various operation modes of the navigation device 4.

Furthermore, although the device controller 13 controls the operation of the navigation device 4 in the above-described example, the device controller 13 may alternatively control the operation of another onboard device. For instance, the device controller 13 may control the operation of an audio device and an air-conditioning device in accordance with the movement of the device operating unit 10.

The invention claimed is:

1. An apparatus for operating a device comprising:
    a steering wheel; and
    a gripping section of the steering wheel for gripping by a driver; and
    an onboard device equipped in a vehicle; and
    a device operating unit for operating the onboard device; and
    a device controller that controls operation of the onboard device based on the movement of the device operating unit; wherein,
    the device operating unit is ring-shaped and is attached to the gripping section so as to surround an outer periphery of the gripping section, and
    the device operating unit is configured to rotate on a first axis that is a central axis of the device operating unit and is configured to tilt on a second axis perpendicular to the first axis.

2. The apparatus for operating a device according to claim 1,
    wherein the device operating unit has an outer peripheral edge that is substantially circular.

3. The apparatus for operating a device according to claim 2,
    wherein the device controller controls first channels of the onboard device based on a rotation amount of the device operating unit and controls second channels of the onboard device based on the number of times the device operating unit is tilted.

4. The apparatus for operating a device according to claim 3,
    wherein the onboard device has a display unit disposed facing the driver and displays the first channels side-by-side in a left-right direction of the display unit and the second channels side-by-side in an up-down direction of the display unit, and
wherein the device controller selects one of the first channels in the left-right direction based on the rotation amount of the device operating unit and selects one of the second channels in the up-down direction based on the number of times the device operating unit is tilted.

5. The apparatus for operating a device according to claim 2,
wherein the device operating unit is configured to slide along a third axis perpendicular to both the first axis and the second axis.

6. The apparatus for operating a device according to claim 5,
wherein the device controller sets the operation of the onboard device based on a third axis sliding position of the device operating unit.

7. The apparatus for operating a device according to claim 2, further comprising:
a locking section that locks the movement of the device operating unit.

8. The apparatus for operating a device according to claim 2,
wherein the gripping section has a recess that is wide at a surface side and a reverse surface side thereof such that a contact range in which a finger of the driver comes into contact with the device operating unit is increased, the recess being provided at a position where the device operating unit is disposed in the gripping section.

9. The apparatus for operating a device according to claim 1,
wherein the device controller controls first channels of the onboard device based on a rotation amount of the device operating unit and controls second channels of the onboard device based on the number of times the device operating unit is tilted.

10. The apparatus for operating a device according to claim 9,
wherein the onboard device has a display unit disposed facing the driver and displays the first channels side-by-side in a left-right direction of the display unit and the second channels side-by-side in an up-down direction of the display unit, and
wherein the device controller selects one of the first channels in the left-right direction based on the rotation amount of the device operating unit and selects one of the second channels in the up-down direction based on the number of times the device operating unit is tilted.

11. The apparatus for operating a device according to claim 1,
wherein the device operating unit is configured to slide along a third axis perpendicular to both the first axis and the second axis.

12. The apparatus for operating a device according to claim 11,
wherein the device controller sets the operation of the onboard device based on a third axis sliding position of the device operating unit.

13. The apparatus for operating a device according to claim 1, further comprising
a locking section that locks the movement of the device operating unit.

14. The apparatus for operating a device according to claim 1,
wherein the gripping section has a recess that is wide at a surface side and a reverse surface side thereof such that a contact range in which a finger of the driver comes into contact with the device operating unit is increased, the recess being provided at a position where the device operating unit is disposed in the gripping section.

15. The apparatus for operating a device according to claim 1, further comprising a movement detector disposed inside the gripping section for detecting movement of the tillable and rotatable device operating unit, said movement detector being in communication with the device controller to convey changes in the movement in the device operating unit to the device controller.

16. An apparatus for operating a device comprising:
a steering wheel; and
a gripping section of the steering wheel for gripping by a driver; and
an onboard device equipped in a vehicle; and
a device operating unit for operating the onboard device; and
a device controller that controls operation of the onboard device based on the movement of the device operating unit; wherein,
the device operating unit is ring-shaped and is disposed to surround an outer periphery of the gripping section, the device operating unit is configured to rotate on a first axis that is a central axis of the device operating unit and is further configured to be adjustable about at least one different, additional freedom of movement relative to the steering wheel; and
the device controller controls operation of the onboard device based on the rotation movement of the device operating unit as well as based on the at least one additional freedom of movement of the device operating unit.

17. The apparatus for operating a device according to claim 16, further comprising a movement detector disposed inside the gripping section for detecting movement of the device operating unit, said movement detector being in communication with the device controller to convey rotation changes in the device operating unit to the device controller.

18. The apparatus for operating a device according to claim 17, wherein the at least one different, additional freedom of movement relative to the steering wheel includes both tilt movement, Wherein the device operating unit is configured to tilt on a second axis perpendicular to the first axis, and slide movement, wherein the device operating unit is configured to slide along a third axis perpendicular to both the first axis and the second axis, and the movement detector being configured to independently detect changes in rotation movement, tilting movement and sliding movement in the device operating unit, and said movement detector being in communication with the device controller to convey to the device controller said detected changes.

* * * * *